UNITED STATES PATENT OFFICE 2,307,495

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application July 7, 1941, Serial No. 401,383

3 Claims. (Cl. 252—340)

This invention relates primarily to the resolution of petroleum emulsions.

One object of my invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The composition of matter herein described, that is used as the demulsifying agent of our process, is obtained by blowing or oxidation of water-insoluble oxyalkylated triricinolein, particularly oxyalkylated castor oil, and more specifically, oxyethylated castor oil. The manner of blowing or oxidizing such products is substantially the same as is employed to oxidize or blow castor oil, ricinoleic acid and the like.

It is well known that oxidized oils can be obtained from castor oil, ricinoleic acid and various derivatives of ricinoleic acid, such as monoricinolein, diricinolein and polyricinoleic acids. They are produced by the common practice of blowing or oxidizing castor oil and similar fatty oils or acids, particularly non-drying unsaturated fatty oils, by means of a gaseous medium, such as air, oxygen, ozone, or ozonized air. The gaseous medium, such as air, may be moist or dry and the oxidation may take place in the presence or absence of a catalyst. The catalyst may be of a metallic type, such as lead ricinoleate, cobalt ricinoleate, manganese ricinoleate, etc.; or it may be of the organic type which produces peroxide, such as alpha pinene, linseed oil, etc. Oxidation may take place at atmospheric pressure or superatmosphere pressure, i. e., pressures up to or including 200 pounds gauge pressure, and at any temperature slightly above the boiling point of water, for instance, 120° C. up to any temperature which does not produce undue decomposition by pyrolytic reaction.

The time of blowing may be fairly brief, for example, 8-10 hours; or it may be quite extensive, for instance, as long as 10—12—14 days, the longer time periods being employed generally when the temperature is just slightly above the boiling point of water and when oxidation is with air at atmospheric pressure.

One method of preparing drastically oxidized castor oil is described in U. S. Patent No. 2,023,979, dated December 10, 1935, to Stehr. Also see U. S. Patent No. 2,183,487, dated December 12, 1939, to Colbeth.

Thus, the same conventional procedure or procedures employed for the oxidation of castor oil or similar compounds is equally suitable for the blowing or oxidation of water-insoluble oxyalkylated triricinoleins. In most instances the period of oxidation is apt to be much longer. For instance, it may require two or three times as long under similar conditions to blow or oxidize oxyalkylated triricinoleins to the same degree of oxidation as is required for castor oil. Inversely, if one attempts to obtain the same degree of oxidation within the same period of time, the step of oxidation itself must be more vigorous.

It is well known that the exact composition of ordinary oxidized castor oil is not known. This has been a matter of comment from time to time in the literature, including the patent literature dealing with arts in which blown castor oil is contemplated. However, it is obvious that the nature of the products obtained by the oxidation of oxyalkylated triricinolein must be significantly different from those obtained by the oxidation of castor oil. It is obvious that oxidized water-insoluble oxyalkylated triricinolein must be of a different nature than ordinary oxidized castor oil.

It is well known that if triricinolein, preferably in the form of castor oil, is treated with an oxyalkylating agent, particularly ethylene oxide, propylene oxide, butylene oxide, glycidol, or the like, and if one employs a large molecular proportion of the oxyalkylating agent for each mole of occurrence of the ricinoleyl radical, that one can convert castor oil into a water-soluble product. The conventional procedure is well known, and generally speaking, involves nothing more or less than heating castor oil in the presence of successive small amounts of alkylene oxide or the like, under comparatively low pressures and fairly low temperatures, and usually in the presence of an alkaline catalyst, as, for example, sodium ricinoleate. The temperatures employed are generally above 100° C. and below 200° C. The pressures employed are generally above 100 pounds gauge and below 300 pounds gauge pressure. Sometimes oxyalkylation is conducted in a continuous manner by introduction of the ethylene oxide in a gaseous state. More frequently, and most conveniently, the oxide is introduced in a liquid form in a comparatively small amount, for instance, 300 pounds of castor oil and 30 pounds of ethylene oxide, along with approximately one pound of sodium ricinoleate. Reaction is allowed to take place under pressure in the manner above described until all the ethylene oxide is absorbed. Another portion of ethylene oxide is added, and the procedure repeated until water solubility is obtained. Not infrequently as many as 30 pound moles of the oxyalkylating agent are employed for one pound mole of triricinolein, in order to obtain complete water solubility. Needless to say, ethylene oxide promotes solubility in lower molecular proportions than propylene oxide or butylene oxide. Furthermore, ethylene oxide is preferable, due to its greater reactivity.

We have found that if one oxyalkylates triricinolein with any of the oxyalkylating agents indicated, particularly ethylene oxide, to a point definitely short of water solubility, and if one employs such water-insoluble oxyalkylated triricinolein or triricinoleins instead of triricinolein in a conventional oxidation or blowing operation of the kind conventionally employed in connection with castor oil, one obtains a new composition of matter which is particularly effective as a demulsifier for water-in-oil emulsions.

In view of what has been said previously, it hardly appears necessary to give further directions as to the manufacture of the product herein contemplated as a new composition of matter, and particularly as a demulsifier for petroleum emulsions of the water-in-oil type. However, for purposes of convenience, the following is included:

*Oxyalkylated triricinolein—Example 1*

One pound mole of triricinolein in the form of castor oil is treated with three pound moles of ethylene oxide in the manner previously described.

*Oxyalkylated triricinolein—Example 2*

The same procedure is followed as in oxyalkylated triricinolein, Example 1, preceding, except that six moles of ethylene oxide are employed instead of three moles.

*Oxyalkylated triricinolein—Example 3*

The same procedure is followed as in oxyalkylated triricinolein, Example 1, preceding, except that nine moles of ethylene oxide are employed instead of three moles.

*Composition of matter—Example 1*

One thousand pounds of water-insoluble oxyalkylated triricinolein of the kind exemplified by Example 1, preceding, is placed in an oxidation vessel, so that the depth of reactant through which air is forced, is at least 3 feet, and steam coils are used so as to maintain a temperature of approximately 115 to 130° C. No catalyst is added. The incoming air is distributed through a connection with a suitable number of small openings. Air is passed through at a rate so as to obtain uniform distribution and complete contact with the mass to be oxidized. The material is oxidized for a period of times varying from 300 hours to 500 hours, but, in any event, oxidation is stopped at a point short of stringyness or incipient rubber-like character. Other conventional oxidation procedures of the kind employed in the oxidation of castor oil may be use if desired.

*Composition of matter—Example 2*

The same procedure is followed as in comp sition of matter, Example 1, preceding, exce that one employs an oxylkylated triricinolein the kind exemplified by Example 2, precedir instead of the kind described under Example preceding.

*Composition of matter—Example 3*

The same procedure is employed as in cor position of matter, Example 1, except that o employs an oxyalkylated triricinolein of the ki exemplified by Example 3, preceding, instead the kind described under Example 1, precedir Conventional demulsifying agents employed the treatment of oil field emulsions are used such, or after dilution with any suitable solve: such as water; petroleum hydrocarbons, such gasoline, kerosene, stove oil, a coal tar produ such as benzene, toluene, xylene, tar acid ( cresol, anthracene oil, etc. Alcohols, particula: aliphatic alcohols, such as methyl alcohol, etl alcohol, denatured alcohol, propyl alcohol, bu alcohol, hexyl alcohol, octyl alcohol, etc., m be employed as diluents. Miscellaneous solven such as pine oil, carbon tetrachloride, sulfur ( oxide extract obtained in the refining of p troleum, etc., may be employed as diluen Similarly, the material or materials herein c scribed may be admixed with one or more of t solvents customarily used in connection w: conventional demulsifying agents, provided tl such compounds are compatible. They will compatible with the hydrophile type of solve in all instances. Moreover, said material or m terials may be used alone, or in admixture w: other suitable well known classes of demulsi: ing agents.

It is well known that conventional demulsi: ing agents may be used in a water-soluble foi or in an oil-soluble form, or in a form exhib ing both oil and water solubility. Sometin they may be used in a form which exhibits re. tively limited oil solubility. However, since su reagents are sometimes used in a ratio of 1 10,000, or 1 to 20,000, or even 1 to 30,000, su an apparent insolubility in oil and water is r significant, because said reagents undoubte have solubility within the concentration e ployed. This same fact is true in regard to 1 material or materials herein described.

We desire to point out that the superiority the reagent or demulsifying agent contempla in our herein described process for breaking 1 troleum emulsions, is based upon its ability treat certain emulsions more advantageously a at a somewhat lower cost than is possible w other available demulsifiers, or conventional m tures thereof. It is believed that the particu desmulsifying agent or treating agent herein ( scribed will find comparatively limited appli tion, so far as the majority of oil field emulsic are concerned; but we have found that sucl demulsifying agent has commercial value, as will economically break or resolve oil field em sions in a number of cases which can not treated as easily or at so low a cost with t demulsifying agents heretofore available.

In practising our improved process for reso ing petroleum emulsions of the water-in-oil ty a treating agent or demulsifying agent of kind above described is brought into contact w or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

Having thus described our invention, what we claim as new and desire to secure by Letters Patent is:

1. A process for breaking petroleum emulsions of the water-in-oil type, characterized by subjecting the emulsion to the action of a demulsifying agent comprising a drastically oxidized water-insoluble oxyalkylated triricinolein.

2. A process for breaking a petroleum emulsion of the water-in-oil type, characterized by subjecting the emulsion to the action of a demulsifying agent comprising a drastically oxidized water-insoluble oxyethylated triricinolein.

3. A process for breaking a petroleum emulsion of the water-in-oil type, characterized by subjecting the emulsion to the action of a demulsifying agent comprising a drastically oxidized water-insoluble oxyethylated castor oil; the oxyethylation of said castor oil involving at least three and not more than nine moles of ethylene oxide for each mole of triricinolein employed prior to oxidation.

MELVIN DE GROOTE.
BERNHARD KEISER.